(12) United States Patent
Daerr et al.

(10) Patent No.: US 11,340,363 B2
(45) Date of Patent: May 24, 2022

(54) APPARATUS, SYSTEM, METHOD AND COMPUTER PROGRAM FOR RECONSTRUCTING A SPECTRAL IMAGE OF A REGION OF INTEREST OF AN OBJECT

(71) Applicant: KONINKLIJKE PHILIPS N.V., Eindhoven (NL)

(72) Inventors: Heiner Daerr, Hamburg (DE); Bernhard Johannes Brendel, Norderstedt (DE); Axel Thran, Hamburg (DE); Artur Sossin, Hamburg (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/962,857

(22) PCT Filed: Jan. 17, 2019

(86) PCT No.: PCT/EP2019/051085
§ 371 (c)(1),
(2) Date: Jul. 17, 2020

(87) PCT Pub. No.: WO2019/141747
PCT Pub. Date: Jul. 25, 2019

(65) Prior Publication Data
US 2020/0348425 A1    Nov. 5, 2020

(30) Foreign Application Priority Data

Jan. 19, 2018 (EP) .................... 18152442

(51) Int. Cl.
*G01T 1/29* (2006.01)
(52) U.S. Cl.
CPC ................... *G01T 1/2928* (2013.01)

(58) Field of Classification Search
CPC .................................................. G01T 1/2928
See application file for complete search history.

(56) References Cited

U.S. PATENT DOCUMENTS 7,208,739 B1    4/2007  Yanoff
8,378,310 B2    2/2013  Bornefalk
(Continued)

FOREIGN PATENT DOCUMENTS

WO    WO2016076767 A1    5/2016

OTHER PUBLICATIONS

PCT International Search Report, International application No. PCT/EP2019/051085, dated Apr. 25, 2019.
(Continued)

*Primary Examiner* — Hugh Maupin
(74) *Attorney, Agent, or Firm* — Larry Liberchuk

(57) ABSTRACT

The invention relates to an image reconstruction apparatus comprising a detector value providing unit for providing detector values for each detector element of a plurality of detector elements forming a radiation detector and for each energy bin of a plurality of predefined energy bins, a correlation value providing unit for providing correlation values, wherein a correlation value is indicative of a correlation of a detector value detected by a detector element in an energy bin with at least one of a) a detector value detected by another detector element in the energy bin, b) a detector value detected by another detector element in another energy bin, and c) a detector value detected by the detector element in another energy bin, and a spectral image reconstruction unit for reconstructing a spectral image based on the detector values and the correlation values.

11 Claims, 4 Drawing Sheets

(56) References Cited

U.S. PATENT DOCUMENTS

2017/0004637 A1* 1/2017 Koehler .............. G06T 11/006
2018/0235562 A1* 8/2018 Petschke .............. A61B 6/032

OTHER PUBLICATIONS

Duarte D.D. et al., "Charge Share Corrections and Low Energy Noise Performance in a Small Pixel CdTe Detector", Department of Physics, University of Surrey, Sep. 2012.

Rajbhandary P.L. et al., "Effect of Spatio-Energy Correlation in PCD Due to Charge Sharing, Scatter, and Secondary Photons", Proceedings SPIE 10132, Medical Imaging 2017: Physics of Medical Imaging, vol. 101320, (2017).

Roessl E. et al., "K-Edge Imaging in X-Ray Computed Tomography Using Multi-Bin Photon Counting Detectors", IOP Publishing Physics in Medicine and Biology, Physics in Medicine & Biology, vol. 52, pp. 4679-4696, 2007.

Taguchi K. et al., "Spatio-Energetic Cross Talk in Photon Counting Detectors: Detector Model and Correlated Poisson Data Generator", Medical Physics, 43 (12), Dec. 2016, pp. 6386-6404.

Fessler J.A. et al., "Statistical Image Reconstruction Methods for Transmission Tomography", Handbook of Medical Imaging, (SPIE, Bellingham,WA, 2000), vol. 2, Chap. 1, pp. 1-70 (2000).

Brendel B. et al., "Penalized Maximum Likelihood Reconstruction for X-Ray Differential Phase-Contrast Tomography", Medical Physics, vol. 43, No. 1, Jan. 2016.

\* cited by examiner

APPARATUS, SYSTEM, METHOD AND COMPUTER PROGRAM FOR RECONSTRUCTING A SPECTRAL IMAGE OF A REGION OF INTEREST OF AN OBJECT

FIELD OF THE INVENTION

The invention relates to an apparatus, a system, a method and a computer program for reconstructing a spectral image of a region of interest of an object.

BACKGROUND OF THE INVENTION

For spectral imaging, detectors comprising a plurality of detector elements are used, wherein the detector values measured by these detector elements can be strongly correlated due to a charge sharing effect. This correlation is a source of image noise and additionally reduces the resolution of the detector and introduces bias.

SUMMARY OF THE INVENTION

It is an object of the present invention to provide an apparatus, a system, a method and a computer program for reconstructing a spectral image of a region of interest of an object, which allow for an improved image quality of the reconstructed spectral image.

In a first aspect of the present invention, an image reconstruction apparatus for reconstructing a spectral image of a region of interest of an object is presented, wherein the image reconstruction apparatus comprises i) a detector value providing unit for providing detector values for each detector element of a plurality of detector elements forming a radiation detector and for each energy bin of a plurality of predefined energy bins, wherein a detector value is indicative of radiation being detected by a detector element in one of the energy bins after having traversed the region of interest, ii) a correlation value providing unit for providing correlation values, wherein a correlation value is indicative of a correlation of a detector value detected by a detector element in an energy bin with at least one of a) a detector value detected by another detector element in the energy bin, b) a detector value detected by another detector element in another energy bin, and c) a detector value detected by the detector element in another energy bin, and iii) a spectral image reconstruction unit for reconstructing a spectral image based on the detector values and the correlation values.

When using a spectral imaging detector comprising a plurality of detector elements the detector values provided by the detector elements are positively correlated, due to, for instance, the charge sharing effect, wherein the detector values are not only correlated between different detectors, but also between different energy bins. The correlation between the detector values detected by the detector elements can also be regarded as a correlation between the detector elements. This correlation can be modeled or measured and the information about the correlation can be provided in form of correlation values. It has been found that, if a spectral image reconstruction is based not only on the detector values detected by the detector elements but also on the correlation values providing the information of the correlation between the detector values, the noise introduced by the correlation of the detector values in the reconstructed image can be effectively reduced.

The detector value providing unit can be a storing unit in which the detector values are stored already and from which the detector values can be retrieved. The detector value providing unit can also be a receiving unit for receiving the detector values from a spectral imaging system like, for instance, a spectral computed tomography system, wherein the detector value providing unit can be adapted to provide the received detector values.

The spectral imaging system generating the detector values and providing the detector values to the detector value providing unit comprises a radiation source for generating radiation with different radiation energies, and a detector comprising a plurality of detector elements for detecting the radiation after having traversed a region of interest of an object within the spectral imaging system. Preferably, the object is a patient, wherein the region of interest of the patient can be any region of the patient, for instance, the head of a patient, the torso of a patient, a limb of the patient or an organ of the patient. The object can also be, for instance, a suitcase or a bag, wherein the region of interest is a part of the suitcase or bag or the whole suitcase or bag. The detector is preferably a detector comprising a direct conversion material directly converting the radiation into an electrical signal. The direct conversion material can be a cadmium zinc telluride (CZT), a cadmium telluride (CdTe) or silicon (Si) material. The generated radiation is preferably x-ray radiation. Preferably, the spectral imaging system is a spectral CT-system, but the spectral imaging system can be any imaging system in which a provided radiation is detected after having traversed a region of interest, for instance, a spectral projectional radiography system, a spectral fluoroscopy system, etc. The radiation energies preferably form a radiation spectrum, but can also form a plurality of discrete radiation energies. For providing the radiation a fast kVp-switching method in a dual energy system or dual-source system can be used. Also other methods for providing radiation with different energies can be contemplated. The radiation energies provided by the radiation source can be divided into a plurality of energy bins, wherein each energy bin comprises a part of the radiation energies and is defined by a lower energy threshold and an upper energy threshold referring to the boundaries of the energy bin, wherein the energy bins, i.e. the lower and upper thresholds of the energy bins, are predetermined. Preferably, the selection of the energy bins, i.e. the selection of the lower and upper energy thresholds of the energy bins, depends on the imaging task, i.e. depends on the spectral image that should be reconstructed. In one example a first energy bin can be determined as having a lower threshold of 20 keV and an upper threshold of 60 keV and a second energy bin as having a lower threshold of 60 keV and an upper threshold of 120 keV, but also other thresholds and more energy bins can be contemplated.

The detector values are indicative of radiation detected by the detector elements of the detector in the predetermined energy bins, wherein the radiation is provided by the radiation source. Each detector element generates a detector value for each predefined energy bin. Preferably, the spectral imaging system provides for each detector element and each energy bin the number of photons that interacted with the detector element in that energy bin during a predetermined time period, i.e. counts the number of photons having an energy corresponding to the energy bin that are detected by the detector element in the predetermined time period, as the detector value for that detector element and that energy bin.

The correlation value providing unit can be a storing unit in which the correlation values are stored already and from which the correlation values can be retrieved. The correlation value providing unit can also be a receiving unit for receiving the correlation values, for instance, from a measurement unit measuring the correlation values. Moreover, the correlation value providing unit can also be a correlation value generation unit which generates the correlation values, for instance, based on a model of the correlation between the detector values of the detector elements.

A correlation between values is defined as a mathematical relationship between the values for which a change in one value causes a change in the correlated values. Preferably, the correlation between the detector values is a positive correlation that can be any kind of mathematical relationship in which an increase of a detector value causes an increase of the correlated detector values and a decrease of a detector value causes a decrease of the correlated detector values. The correlation between the detector values can be due to a charge sharing effect, wherein radiation, i.e. a photon, detected in one detector element causes an additional detection in another detector element, in particular, in an adjacent detector element, or wherein the detection of radiation, i.e. a photon, in one energy bin, causes an additional detection in another energy bin. The correlation can also have other physical causes leading to a correlation of the detector values, for instance, K-fluorescence escape or electronic cross-talk of the detector elements. The correlation can also be due to a combination of different causes, for instance, due to a combination of a charge sharing effect and a K-fluorescence escape effect.

The spectral image reconstruction unit reconstructs a spectral image based on the provided detector values and the provided correlation values, wherein preferably the image reconstruction unit uses the correlation values during the reconstruction to compensate for the correlation of the detector values. Since the reconstruction unit reconstructs the spectral image such that the correlation between the detector values is compensated for, the reconstructed spectral image is less noisy, has a better resolution and shows a decreased bias. The reconstructed spectral image can be any kind of image reconstructed using data from a spectral imaging system, for instance, the spectral image can be a monoenergetic image, a virtual non-contrast image, one or more material images, a photoelectric image, a Compton scatter image, etc.

In an embodiment the correlation value providing unit is adapted to provide at least one correlation value for each detector element and each energy bin, wherein a correlation value provided for a detector element and an energy bin is indicative of a correlation of the detector value detected by a detector element in an energy bin with at least one of a) a detector value detected by another detector element in the energy bin, b) a detector value detected by another detector element in another energy bin, and c) a detector value detected by the detector element in another energy bin. Preferably, the correlation value providing unit provides a plurality of correlation values for each detector element and each energy bin, wherein the provided correlation values for a detector element and an energy bin comprise correlation values that are indicative for all correlations of the detector value detected by the detector element in the energy bin with a) the detector values detected by other detector elements in the energy bin, b) the detector values detected by the detector elements in other energy bins, and c) the detector values detected by other detector elements in all other energy bins. It is contemplated that the correlation value provided by the correlation value providing unit can also be zero, for instance, if a detector value is not correlated with another detector value, wherein at least one correlation value provided by the correlation value providing unit is not zero indicating at least two correlated detector values. Preferably, the correlation values for a detector element are non-zero for detector elements adjacent to the detector element and zero for detector elements being not adjacent to the detector element.

The correlation value providing unit is preferably adapted to provide correlation values defining a correlation matrix, wherein the spectral image reconstruction unit is adapted to reconstruct the spectral image based on the correlation matrix and the detector values. Preferably, the correlation value providing unit also provides the correlation matrix, wherein the correlation values are forming the matrix elements of the correlation value. For instance, one correlation value can define one matrix element or a combination of correlation values might define one matrix element. The matrix might also comprise matrix elements not defined by the correlation values, for instance, matrix elements defined by the variances of the detector values, or might comprise matrix elements that are defined by correlation values in combination with other parameters.

In another embodiment the image reconstruction apparatus further comprises a model value generation unit for generating a model value for each detector element and each energy bin, wherein a model value is generated based on an adaptable model of a traversal of a radiation ray through the region of interest and based on a model of the interaction of the radiation ray with the detector element for which the model value is generated, wherein the spectral image reconstruction unit is further adapted to reconstruct the spectral image based on the correlation values, the detector values and the model values. In particular, the adaptable model of the traversal of the radiation through the region of interest comprises an adaptable model of the anatomical structures within the region of interest, for instance, the tissues in the region of interest, wherein the spectral image reconstruction unit is preferably adapted to reconstruct the spectral image such that the adaptable model of the structure of the region of interest is adapted until the model values correspond to the detector values, wherein during the adaptation the correlation values are taken into account. Preferably a model value is generated based on a model being indicative of the interaction of the radiation ray with the tissue in the region of interest of the object.

Preferably, the model value for a detector element and an energy bin is further based on a model of the correlation between the detector value detected by the detector element in the energy bin with at least one detector value detected by another detector element in the energy bin. Accordingly, the model values take the correlation of the detector values of the different detector elements in an energy bin into account. Thus, the model on which the model values are based can be improved such that also the reconstructed spectral image that is reconstructed based on the model values can be improved.

Moreover, it is preferred that the model of the interaction of a radiation ray with a detector element is based on a detector response function indicative of the response of the detector element to the incidence of radiation at different energies on the detector element. The response function can be regarded as describing the response of a detector element, for instance, an electrical response, to the incidence of a radiation ray, i.e. a photon, on the detector element. Moreover, the response function can be regarded as being indicative for the probability to detect a radiation ray, i.e. a photon, with energy E within a pulse height interval U and $U+\Delta U$.

Furthermore, it is preferred that the model values are determined based on $\lambda_b^d(\vec{A}) \equiv \lambda'^d_b(\vec{A}^d) + \tilde{\lambda}_b^d(\vec{A}^{j \neq d})$, wherein $\vec{A}$ comprises the lengths of anatomical structures within the region of interest as seen by the radiation rays contributing to a detector value detected by an detector element in an energy bin, $\lambda_b^d(\vec{A})$ is the model value for a detector element d and an energy bin b, $\lambda'^d_b(\vec{A}^d)$ is defined as $$\lambda'^{d}_{b} = \int_0^\infty \phi^d(E) \int_{u_b^T}^{u_b^{T+1}} R'^d(E, U) dU \, \exp\left(-\sum_{\alpha=1}^{N_\alpha} f_\alpha(E) A_\alpha^d\right) dE$$

and $\tilde{\lambda}_b^d$ is defined as $$\tilde{\lambda}^{d}_{b} = \sum_{j \neq d}^{N_D} \int_0^\infty \phi^j(E) \int_{u_b^T}^{u_b^{T+1}} \tilde{R}^j(E, U) dU \, \exp\left(-\sum_{\alpha=1}^{N_\alpha} f_\alpha(E) A_\alpha^j\right) dE,$$

wherein $\phi^d(E)$ is the energy spectrum provided by the radiation source seen by each detector element d and $\phi^j(E)$ is the energy spectrum of the radiation provided by the radiation source seen by each detector element j, $f_\alpha(E)$ is the energy dependent linear attenuation coefficient of the radiation in a tissue $\alpha$, $R'^d(E,U)$ is a response function of detector element d for radiation incident on detector element d in dependence of the energy of the radiation E and the pulse height U, $\tilde{R}^j(E,U)$ is a response function of an detector element d when radiation is incident on detector element j, $N_D$ is the number of detector elements, $u_b^T$ is the lower threshold of a pulse height for energy bin b, and $u_b^{T+1}$ is the upper threshold of a pulse height for energy bin b.

The pulse heights U refer to the pulse height of an electrical pulse generated by a respective detector element in accordance to the incidence of radiation on the detector. In particular, the pulse height U refers to an electrical pulse generated by a respective detector element in accordance to the incidence of one photon of the radiation on the detector. Preferably, the pulse heights are directly proportional to the energy of the incident radiation, i.e. photon, detected by a respective detector element. In another embodiment the energy of the incident radiation as detected by a respective detector element is proportional to an area beneath the pulse. The response function of a detector element refers to a probability density for determining the probability of the detector element to generate for incident radiation of energy E a pulse height U in a certain pulse height interval. Moreover, the response functions are indicative of the correlation between the detector elements. Due to the correlation of the detector values, the response function shows a certain probability that a detector element will generate for incident radiation with energy E an electrical pulse proportional to only a part of the energy E, for instance, proportional to $E-\Delta E$, wherein a correlated detector element will generate a pulse proportional to another part of the energy E, for instance, proportional to $\Delta E$.

The upper threshold $u_b^{T+1}$ can be any threshold indicative of the defined energy bin b. In a preferred embodiment one-sided bins are used with $u_b^{T+1}$ defined as $u_b^{T+1}=\infty$, wherein in this embodiment the detector elements are adapted to determine if the energy E of incident radiation, i.e. the photon, is above a lower energy bin threshold. Therefore, in this embodiment radiation, i.e. a photon, incident on a detector element having an energy being larger than the lower energy threshold of a first energy bin, will be also counted in all energy bins being defined by a lower energy threshold above the lower energy threshold of the first energy bin in case the photon, incident on a detector element has an energy being larger than all lower energy thresholds.

In one embodiment the spectral image reconstruction unit is adapted to reconstruct the spectral image by optimizing a cost function, wherein the cost function is based on the model values, the detector values and the correlation values. Preferably, the cost function is based on differences between the model values and the detector values, wherein each difference is defined as a difference between a model value for an energy bin and a detector element and a detector value detected by the detector element for the energy bin. The spectral image reconstruction unit can be adapted to minimize or maximize the cost function for reconstructing the spectral image based on the definition of the cost function. The cost function can be any function depending on the model values, the detector values and the correlation values that is suitable to be used in a spectral image reconstruction, for instance, a negative log-likelihood function. Preferably, the cost function is suitable to be optimized using an iterative algorithm. Moreover, it is preferred that the cost function is optimized when the differences between the model values and the detector values are minimized. Since the model values depend on an adaptable model of a traversal of the radiation through the region of interest, wherein this adaptable model is based on a model of the structure of the region of interest, minimizing the difference between the model values and the detector values leads to an adaptation of the model of the anatomical structures in the region of interest to the real structures of interest and accordingly to a reconstruction of the spectral image.

It is further preferred that the cost function includes a data term D determined based on:

$$D = (\vec{\lambda} - \vec{m}) C^{-1} (\vec{\lambda} - \vec{m}),$$

wherein C is the correlation matrix defined by the correlation values, $\vec{\lambda}$ is a vector comprising the model values and $\vec{m}$ is a vector comprising the detector values. Preferably, $\vec{\lambda}$ is defined as $$\vec{\lambda} = \begin{bmatrix} \lambda_{b=1}^{d=1} \\ \lambda_{b=2}^{d=1} \\ \vdots \\ \lambda_{b=N_B-1}^{d=N_D} \\ \lambda_{b=N_B}^{d=N_D} \end{bmatrix}$$

and $\vec{m}$ is defined as $$\vec{m} = \begin{bmatrix} m_{b=1}^{d=1} \\ m_{b=2}^{d=1} \\ \vdots \\ m_{b=N_B-1}^{d=N_D} \\ m_{b=N_B}^{d=N_D} \end{bmatrix},$$

wherein d defines the respective detector element, b defines the respective energy bin, $N_D$ is the total number of contemplated detector elements and $N_B$ is the total number of energy bins. Since the cost function includes the data term D as defined above, the cost function can take into account the correlation between the detector values for each energy bin and each detector element and thus allows for a compensation of this correlation in the reconstructed spectral image leading to a reduction of noise introduced by the correlation of the detector values.

The spectral image reconstruction unit is further adapted to reconstruct the spectral image based on a penalized likelihood method, wherein the penalized likelihood method is based on the cost function L being defined according to:

$$L = D + R,$$

wherein D is the data term and R is a regularization term. Preferably, the regularization term R regulates the values of adjacent image pixels, i.e. lowers the difference between adjacent image pixel values and is used for further reducing the noise of the reconstructed spectral image. The regularization term can be, for instance, a Gradient-Huber function or a Laplace-Huber function. Other examples for a suitable regularization term can be found, for instance, in the book "Statistical image reconstruction methods for transmission tomography" by J. A. Fessler, Handbook of Medical Imaging, edited by M. Sonka and J. M. Fitzpatrick (SPIE, Bellingham, Wash., 2000), volume. 2, Chap. 1, pages 1-70 (2000).

The reconstruction apparatus further comprises a subset providing unit for providing detector value subsets, wherein the detector value subsets are defined by detector element subsets. The correlation value providing unit is preferably adapted to provide a plurality of correlation values for each detector element and each energy bin of a subset, wherein the provided correlation values for a detector element and an energy bin comprise correlation values that are indicative for the correlation of the detector value detected by the detector element in the energy bin with a) the detector values detected by other detector elements of the subset in the energy bin, b) the detector values detected by the detector element in other energy bins, and c) the detector values detected by other detector elements of the subset in all other energy bins. The spectral image reconstruction unit is preferably adapted to reconstruct the spectral image based on the detector values and correlation values of all subsets. The detector element subsets can be defined through the construction of the detector. For instance, the detector can be constructed to divide the detector elements of the detector into a plurality of detector element groups, wherein the detector values of the detector elements of one group are correlated with each other but not with the detector values of detector elements of other groups. Alternatively, the detector element subsets might not be reflected by a construction of the detector but might be provided in accordance with a knowledge about the correlation behavior of the detector values of the detector elements such that detector elements showing a correlation between their detector values are grouped in the same detector element subset. Preferably, the detector elements of a detector element subset are adjacent to each other. More preferably, the detector comprises an absorption grid and the detector element subsets are defined by the absorption grid, wherein a detector element subset comprises all detector elements within a cell of the absorption grid. Because of the absorption grid a correlation between the detector values of detector elements in different cells of the absorption grid is not to be expected such that only the correlation of the correlation values of the detector elements within a subset has to be considered. Since only the correlation of the detector values in a detector value subset has to be considered, the reconstruction of the spectral image will be computationally more effective and less time-consuming. An absorption grid is defined as a grid comprising absorption elements for absorbing radiation incident on the absorption elements. In a preferred embodiment the absorption grid is an anti-scatter grid or an anti-charge-sharing grid.

In another aspect of the present invention an imaging system for generating a spectral image of a region of interest of an object is presented, wherein the imaging system comprises a) a radiation source for generating radiation with different radiation energies, b) a detector for detecting the radiation generated by the radiation source after having traversed the region of interest, wherein the detector comprises a plurality of detector elements and each detector element detects a detector value for each of a plurality of predefined energy bins, and c) an image reconstruction apparatus as defined above.

In another aspect of the present invention an image reconstruction method for reconstructing a spectral image of a region of interest of an object is presented, wherein the image reconstruction method comprises the steps of i) providing detector values for each detector element of a plurality of detector elements forming a radiation detector and for each energy bin of a plurality of predefined energy bins, wherein a detector value is indicative of radiation being detected by a detector element in one of the energy bins after having traversed the region of interest, ii) providing correlation values, wherein a correlation value is indicative of a correlation of a detector value detected by a detector element in an energy bin with at least one of a) a detector value detected by another detector element in the energy bin, b) a detector value detected by another detector element in another energy bin, and c) a detector value detected by the detector element in another energy bin, and iii) reconstructing a spectral image based on the detector values and the correlation values.

In another aspect of the present invention a computer program for reconstructing a spectral image of a region of interest of an object is presented, wherein the computer program comprises program code means for causing an apparatus for reconstructing a spectral image of a region of interest of an object as defined above to carry out the steps of the method for reconstructing a spectral image of a region of interest of an object as defined above, when the computer program is run on a computer controlling the system.

It shall be understood that a preferred embodiment of the present invention can also be any combination of the dependent claims or above embodiments with the respective independent claims.

These and other aspects of the invention will be apparent from and elucidated with reference to the embodiments described hereafter.

DETAILED DESCRIPTION OF EMBODIMENTS

Figure 1:
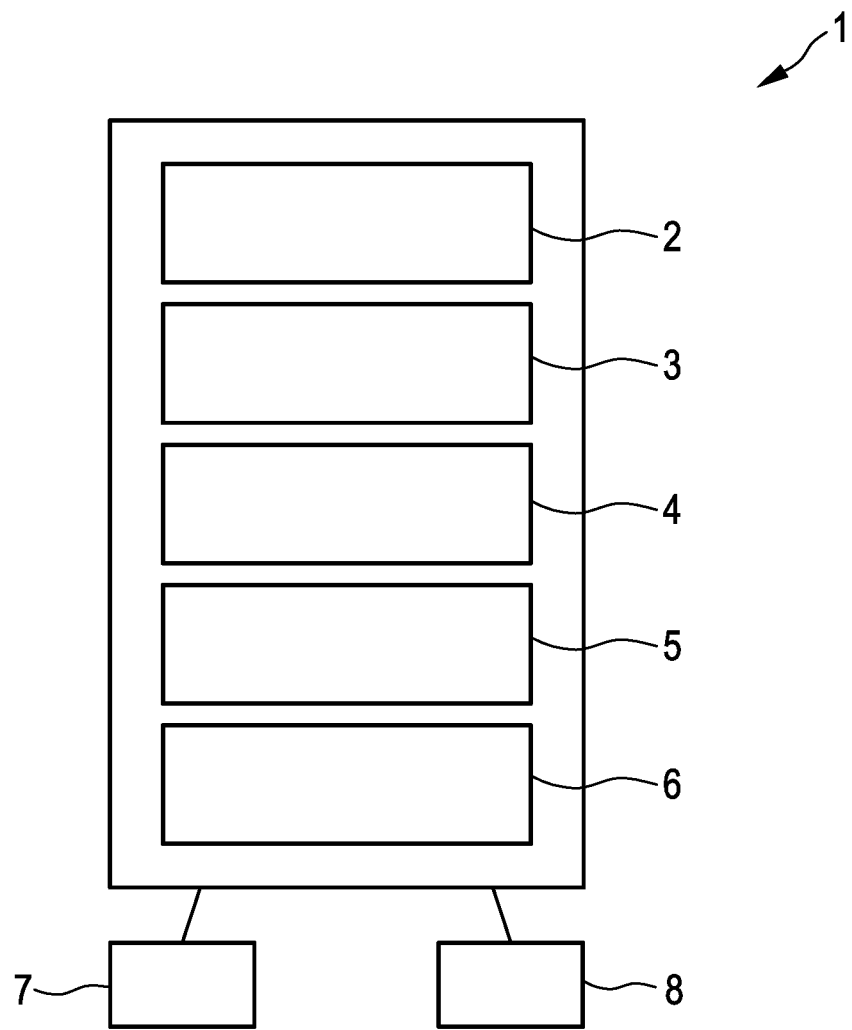
FIG. 1 shows schematically and exemplarily an embodiment of an image reconstruction apparatus for reconstructing a spectral image of a region of interest of an object.

FIG. 1 shows schematically and exemplarily an embodiment of an image reconstruction apparatus for reconstructing a spectral image of a region of interest of an object. In the following embodiment the object is a patient, wherein in other embodiments the object could also be, for instance, a suitcase. The image reconstruction apparatus 1 comprises a detector value providing unit 2 configured to provide detector values for each detector element of a plurality of detector elements forming a radiation detector and for each energy bin of a plurality of predefined energy bins. In this embodiment the detector value providing unit 2 is a receiving unit receiving detector values from a medical imaging system and providing the received detector values. The medical imaging system (not shown in the drawings) is in this embodiment a spectral CT-system, comprising a radiation source for generating x-ray radiation with different energies and a detector comprising a plurality of detector elements for detecting the radiation after having traversed the region of interest of a patient. The detector comprises a direct conversion material for directly converting radiation interacting with the detector into electrical signals. The material can be, for instance, a cadmium zinc telluride (CZT), a cadmium telluride (CdTe) or silicon (Si) material. The detector further comprises in this embodiment an anti-scatter grid, dividing the detector elements in a plurality of detector element subsets, wherein the detector element subsets are defined by the detector elements within the cells of the anti-scatter grid.

The energy, i.e. the spectrum, of the radiation provided by the radiation source is divided into a number of energy bins $N_B$ having an upper and a lower energy threshold. Preferably, three or four energy bins are used. However, in other embodiments also two energy bins or more than four energy bins can be used.

The detector value providing unit 2 receives in this embodiment from the medical imaging system for each detector element one detector value for each predefined energy bin. The detector values are indicative of radiation being detected by the detector elements after having traversed the region of interest of the patient. The patient is preferable a human being. However, the patient can also be an animal. Moreover, in this embodiment a detector value corresponds to a number of photons detected by a detector element during a predefined time period in an energy bin of the predefined energy bins.

In this embodiment the image reconstruction apparatus 1 further comprises a subset providing unit 3, wherein the subset providing unit 3 provides detector value subsets. The detector value subsets are in this embodiment defined by the detector element subsets that are defined by the cells of the anti-scatter grid. Thus the subsets are defined by not showing a substantial amount of correlation between detector elements located in different subsets. Only within a subset a substantial correlation between the detector elements occurs. However, in other embodiments the detector element subsets could also be predefined by a user, i.e. a clinician, or based on knowledge about a correlation between the detector values detected by specific detector elements. Moreover the detector element subsets can also be defined by the construction of the detector, for instance, if the detector is a 1D detector. In other embodiments the subset providing unit 3 can be omitted such that no detector value subsets are provided.

Further, the image reconstruction apparatus 1 comprises a correlation value providing unit 4 for providing correlation values. Since due to the anti-scatter grid no charge sharing or cross-talk is to be expected between detector values of different detector value subsets, in this embodiment it is sufficient to contemplate only the correlation of detector values within a detector value subset. Thus, a correlation value in this embodiment is indicative of a correlation of a detector value detected by a detector element of a detector element subset in an energy bin with at least one of a) a detector value detected by another detector element of the detector element subset in the energy bin, b) a detector value detected by another detector element of the detector element subset in another energy bin, and c) a detector value detected by the detector element in another energy bin. Moreover the correlation value providing unit 4 is adapted to provide the correlation values in form of a correlation value matrix C, wherein the correlation values are matrix elements of the correlation matrix C. Further, in this embodiment the correlation value providing unit 4 is a storing unit in which the correlation values are stored, wherein the storing unit is adapted to provide the correlation values. The correlation values stored in the correlation value providing unit 4 can be correlation values previously determined for the detector of the medical imaging system during a calibration step. To determine the correlation values during the calibration step detector values can be measured by the imaging system using, for instance, phantoms comprising different materials and different material structures. From these measured detector values and the known materials and material structures of the phantoms the correlation values can be determined for a certain material structure by modeling or interpolation using the measured values during calibration. Once the correlation values are determined, the correlation values are stored in the correlation value providing unit 4. However, in other embodiments the correlation values can also be computed based on a correlation model of the detector values. An example for evaluating correlation values between detector values of different detector elements can, for instance, be found in the article "Effect of spatio-energy correlation in PCD due to charge sharing, scatter, and secondary photons" by P. L. Rajbhandary et al., Proc. SPIE 10132, Medical Imaging 2017: Physics of Medical Imaging, volume 101320 (2017).

The image reconstruction apparatus 1 further comprises a spectral image reconstruction unit 5 for reconstructing a spectral image based on the detector values and the correlation values provided by the detector value providing unit 2 and the correlation value providing unit 4. In this embodiment the spectral image reconstruction unit 5 uses a decomposition algorithm comprising a penalized likelihood method for reconstructing the spectral image based on the detector values and the correlation values. The penalized likelihood method is based on a cost function L comprising a data term D and a regularization term R, as, for instance, described in more detail in the article "Penalized Likelihood Decomposition for Dual Layer Spectral CT" by B. Brendel et al., Proceedings of the 4th International Conference on Image Formation in X-Ray Computed Tomography, pages 43-46 (2016). The cost function L can then be determined based on $$L=D+R.$$

The data term D is determined based on the detector values and the correlation values.

In this embodiment the image reconstruction apparatus 1 further comprises a model value generation unit 6 for generating a model value for each detector element and each energy bin. The model values are generated based on an adaptable model of a traversal of the radiation through the region of interest and based on a model of the interaction of the radiation with each detector element. Moreover, a forward model is used for generating the model value, wherein the model further takes into account an energy dependent attenuation by applying the linear attenuation coefficient $f_\alpha(E)$ for each tissue $\alpha$ that is contemplated during the decomposition algorithm and the primary X-ray spectrum $\phi(E)$ being in this case an x-ray spectrum provided by the radiation source. Generally, for cases in which no correlation between the detector values is contemplated, the detector values can be modeled as explained in more detail in "K-edge imaging in x-ray computed tomography using multi-bin photon counting detectors" by E. Roessl et al., Physics in Medicine & Biology, volume 52, pages 4679-4696 (2007) according to:

$$\lambda_b^d = \int_0^\infty \phi^d(E) \int_{u_b^T}^{u_b^{T+1}} R^d(E, U)dU \ \exp\left(-\sum_{\alpha=1}^{N_\alpha} f_\alpha(E) A_\alpha^d\right) dE,$$

wherein $\lambda_b^d$ is a model value for detector element d and energy bin b, $\phi^d(E)$ is the energy spectrum of the radiation source seen from the detector d, $R^d(E,U)$ is a response function of the detector element d dependent on the energy E and the pulse heights U, $N_\alpha$ is a number of tissues contemplated during the reconstruction of the spectral image, $f_\alpha(E)$ is the energy dependent linear attenuation coefficient of the radiation in a tissue $\alpha$, $A_\alpha^d$ refers to the length of a tissue $\alpha$ that is traversed by the radiation ray when travelling in a straight line between the radiation source and the detector element d, $u_b^T$ is the lower threshold of a pulse height for energy bin b, and $u_b^{T+1}$ is the upper threshold of a pulse height for energy bin b. The pulse heights U refer to the pulse height of an electrical pulse generated by a respective detector element in accordance to the incidence of radiation, i.e. a photon, on the detector. In this embodiment the pulse heights U are directly proportional to the energy of the incident radiation detected by a respective detector element. This relation-ship is generally true in a case in which no correlation between the detector values is contemplated and the full energy of radiation, i.e. a photon, is detected in only one detector element.

In the following embodiment the correlation is taken into account and the model value for a detector element and an energy bin is further based on a model of the correlation between the detector values detected by the detector element in the energy bin with at least one detector value detected by another detector element in the energy bin. Accordingly, due to this correlation, the model values do not only depend on the material length $A_\alpha$ seen by a radiation ray from the radiation source to the detector element d, but also are influenced by material lengths $A_\alpha$ seen by neighboring radiation rays from the radiation source to neighboring detector elements. Thus, the model values λ depend not only on the material length $A_\alpha$ as described above, but also on neighboring material length such that $A_\alpha$ has to be contemplated as being a vector $\vec{A}_\alpha$, comprising all material lengths that are seen by radiation rays detected by all detector elements of a detector element subset. For generating the model values λ for a detector element d of a detector element subset in an energy bin b the influence of a radiation ray detected by an adjacent detector element j of the detector element subset in the energy bin is contemplated. Accordingly, the model value $\lambda_b^d$ for a detector element d and an energy bin b can be modeled according to:

$$\lambda_b^d(\vec{A}) = \lambda'^d_b(\vec{A}^d) + \tilde{\lambda}_b^d(\vec{A}^{j\neq d}),$$

wherein $\tilde{\lambda}_b^d(\vec{A}^{j\neq d})$ is a model value indicative of the radiation detected by the detector element d in the energy bin b due to the correlation of the detector values of the detector element d with the detector values of adjacent detector elements. $\lambda'^d_b(\vec{A}^d)$ is indicative of the radiation that is directly detected by the detector element d in the energy bin b. $\lambda'^d_b$ can then be calculated in accordance with:

$$\lambda'^d_b = \int_0^\infty \phi^d(E) \int_{u_b^T}^{u_b^{T+1}} R'^d(E, U)dU \ \exp\left(-\sum_{\alpha=1}^{N_\alpha} f_\alpha(E) A_\alpha^d\right) dE$$

and $\tilde{\lambda}_b^d$ is defined as $$\tilde{\lambda}_b^d = \sum_{j\neq d}^{N_D} \int_0^\infty \phi^j(E) \int_{u_b^T}^{u_b^{T+1}} \tilde{R}^j(E, U)dU \ \exp\left(-\sum_{\alpha=1}^{N_\alpha} f_\alpha(E) A_\alpha^j\right) dE,$$

wherein $\phi^d(E)$ is the energy spectrum provided by the radiation source seen by each detector element d and $\phi^j(E)$ is the energy spectrum of the radiation provided by the radiation source seen by each detector element j, $f_\alpha(E)$ is the energy dependent linear attenuation coefficient of the radiation in a tissue $\alpha$, $R'^d(E,U)$ is a response function of detector element d for radiation incident on detector element d in dependence of the energy of the radiation E and the pulse height U, $\tilde{R}^j(E,U)$ is a response function of an detector element j for radiation detected by the detector element j when radiation is incident on detector element d, $N_D$ is the number of detector elements, $u_b^T$ is the lower threshold of a pulse height for energy bin b, and $u_b^{T+1}$ is the upper threshold of a pulse height for energy bin b.

Figure 2:
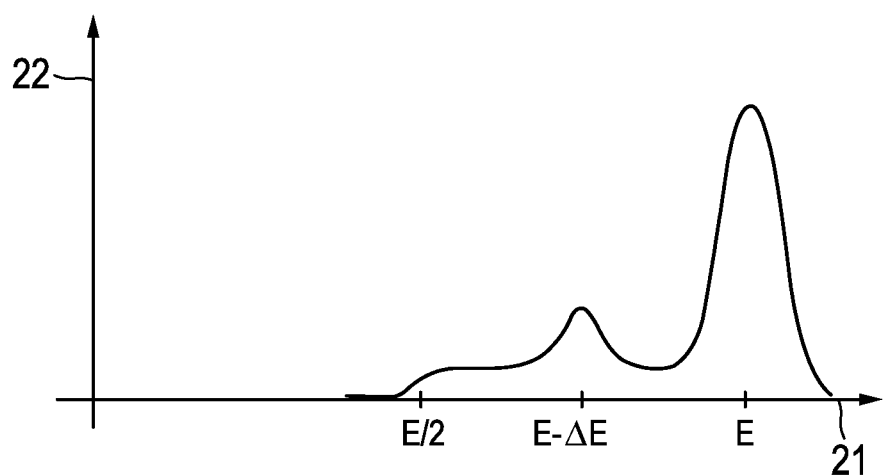
FIGS. 2 and 3 show exemplary graphs illustrating a response function of a detector element d and of a detector element j for radiation detected in the detector element d.
Figure 3:
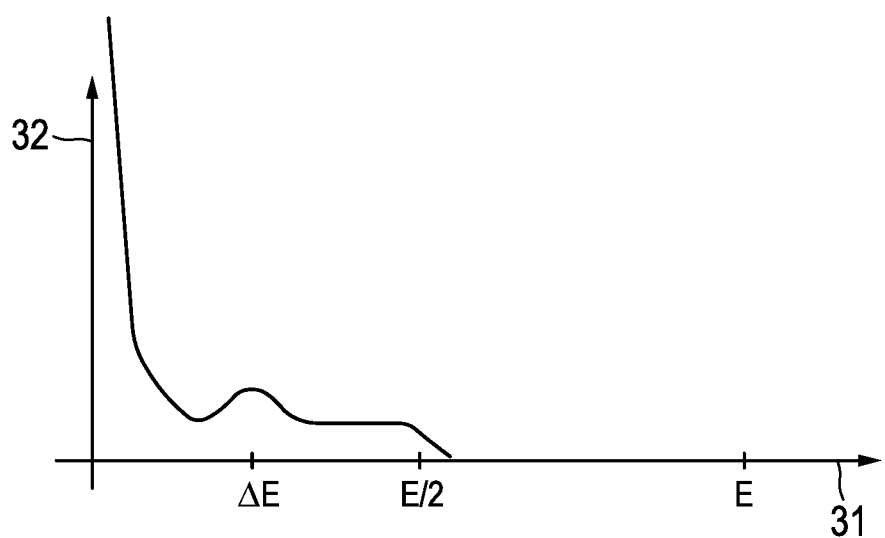

In this embodiment the detector response functions $R'^d(E,U)$ and $\tilde{R}^j(E,U)$ refer to a probability density for determining the probability of the detector element to generate for incident radiation of energy E detected mainly by detector element d a pulse height U, wherein the sum of $R'^d(E,U)$ and $\tilde{R}^j(E,U)$ results in $R^d(E,U)$. FIGS. 2 and 3 show exemplary graphs illustrating the detector response functions $R'^d(E,U)$ and $\tilde{R}^j(E,U)$ for a detector element d and a detector element j for radiation interacting with the detector element d. FIG. 2 shows the response function $R'^d(E,U)$ of a detector element d for incident radiation with energy E mainly detected by the detector element d, wherein the x-axis 21 refers to the pulse height U and the y-axis 22 refers to the probability density. FIG. 3 shows the response function $\tilde{R}^j(E,U)$ of detector element d for incident radiation with energy E on detector element j, wherein the x-axis 31 refers to the pulse height U and the y-axis 32 refers to the probability density. The response functions $R'^d(E,U)$ and $\tilde{R}^j(E,U)$ are indicative for the correlation between the detector elements. Since the response functions for a detector element j adjacent to d are similar to the response functions shown in the figures, it can be seen in the figures that, for instance, if the pulse heights generated by the detector element d correspond to an incident radiation energy $E-\Delta E$ the correlated detector element j will in this example detect also radiation energy of this incident radiation of, i.e. $\Delta E$ and vice versa, due to charge sharing. In consequence, the detected counts within a certain time period are positive correlated. In case the pulse height $E-\Delta E$ is within bin number m of detector element d and $\Delta E$ is within bin number n of detector element j the detector value in detector element d in bin m and the detector value of detector element j in bin m are positive correlated.

The material lengths $A_\alpha^d$ and $A_\alpha^j$ refer to a model of the structure of the region of interest based on the contemplated tissues $\alpha$ within the region of interest, wherein the material lengths $A_\alpha^d$ and $A_\alpha^j$ are determined based on the lengths of tissue $\alpha$ that are traversed by a radiation ray generated by the radiation source and traversing the region of interest in a straight line to a detector element d and j, respectively.

The image reconstruction unit 5 adapts the material lengths $A_\alpha^d$ and $A_\alpha^j$ during the image reconstruction such that the model value generation unit 6 generates a new model value $\lambda$ based on the adapted material length. This process can be repeated until the model values $\lambda$ correspond to the detector values.

For compensating for the influence of the correlation between the detector values of the detectors during the reconstruction of the spectral image in this embodiment the data term D of the cost function L is a weighted least square data term for a negative log-likelihood function, wherein it is assumed that the noise distribution is a Gaussian noise distribution. The data term D can then be written as:

$$D = (\vec{\lambda} - \vec{m}) C^{-1} (\vec{\lambda} - \vec{m}),$$

wherein $\vec{\lambda}$ comprises the model values taking the form of $$\vec{\lambda} = \begin{bmatrix} \lambda_{b=1}^{d=1} \\ \lambda_{b=2}^{d=1} \\ \vdots \\ \lambda_{b=N_B-1}^{d=N_D} \\ \lambda_{b=N_B}^{d=N_D} \end{bmatrix}$$

and $\vec{m}$ comprises the detector values taking the form of $$\vec{m} = \begin{bmatrix} m_{b=1}^{d=1} \\ m_{b=2}^{d=1} \\ \vdots \\ m_{b=N_B-1}^{d=N_D} \\ m_{b=N_B}^{d=N_D} \end{bmatrix}.$$

Accordingly, the vector $\vec{\lambda}$ comprises a model value for each detector element and each energy bin and the vector $\vec{m}$ comprises a detector value for each detector element and each energy bin, wherein $N_B$ is the number of energy bins and $N_D$ the number of detector elements in a detector element subset. C refers to the correlation matrix which in this case is a symmetric n×n matrix with $n=N_B \cdot N_D$. If two-sided energy bins are contemplated the correlation matrix C is given by a symmetric block matrix, wherein each block has a dimension of $N_B \times N_B$. The correlation matrix C comprises the correlation values and therefore comprises information about the correlation between the detector values for each energy bin and each detector element and therefore allows for a compensation for the correlation between the detector values during the reconstruction of the spectral image. Since the data term D is based on a difference between the modeled values $\lambda$ and the detector values m, wherein the modeled values $\lambda$ depend on the material lengths $A_\alpha^d$ and $A_\alpha^j$ for all tissues $\alpha$ contemplated during the reconstruction, the cost function L is optimized by adapting the material lengths $A_\alpha^d$ and $A_\alpha^j$ for each tissue $\alpha$ in an iterative reconstruction until the difference between the modeled values $\lambda$ and the detector values m is minimized. The spectral image can then be reconstructed based on the optimized material lengths $A_\alpha^d$ and $A_\alpha^j$ for each tissue $\alpha$ by using known standard reconstruction methods like, for instance, filtered backprojection (FBP), multichannel reconstruction, iterative multichannel reconstruction or other iterative reconstruction methods, etc.

In the following for a better understanding an example will be given for the reconstruction algorithm contemplating the correlation between the detector values of the detector elements for a system with two detector elements in a detector element subset, two energy bins and two materials, i.e., two different tissues $\alpha_1$ and $\alpha_2$. Moreover, for this example a radiation of energy E is contemplated. The above restrictions are only for the simplicity of this example, wherein the method generally described above can be applied to any polychromatic energy source by simply adding the results for each individual energy in the primary x-ray radiation, a plurality of detector elements per detector element subset, a plurality of energy bins and more than one material without any restrictions.

In this example the model values can be modeled according to the above formula such that, for instance, for a pixel $d=1$ and energy bin $b=1$ and pulse heights between $u_1$ and $u_2$ the model values are given by: $\lambda_1^1(\vec{A}) = \int_0^\infty \phi^1(E) \int_{u_1}^{u_2} R'^1(E,U) dU \exp(-f_{m1}(E) * A_{m1}^{-1} - f_{m2}(E) * A_{m2}^{-1}) dE + \int_0^\infty \phi^2(E) \int_{u_1}^{u_2} \tilde{R}^2(E,U) dU \exp(-f_{m1}(E) * A_{m1}^{-2} - f_{m2}(E) * A_{m2}^{-2}) dE$ wherein all parameters correspond to the parameters explained above for the more general formulation of the formulas. In this simplified example the correlation matrix C can be written as:

$$C = \begin{bmatrix} \lambda_1^1 & 0 & W & X \\ 0 & \lambda_2^1 & Y & Z \\ W & Y & \lambda_1^2 & 0 \\ X & Z & 0 & \lambda_2^2 \end{bmatrix},$$

wherein the correlation values W, X, Y, Z can be derived from measurements as already explained above. Alternatively, in the following for this simplified example it will be described how the values of the correlation matrix can also be computed. For instance, the correlation value W is indicative for a correlation between the detector value of the detector element d=1 in the energy bin b=1 with the detector value of the detector element d=2 in the energy bin b=1. The correlation is composed of two influences being 1.) the influence of radiation being detected in detector element d=1 and energy bin b=1 on the detector value detected in detector element d=2 and energy bin b=1 and 2.) the influence of radiation being detected in detector element d=2 and energy bin b=1 on the detector value being detected in detector element d=1 and energy bin b=1. Due to the correlation caused by the charge sharing effect between the detector values the detected pulse height p' in detector element d=1 results in a detected pulse height $\tilde{p}=E-p'$ in detector element d=2. In this case, p' is within energy bin b=1 and $\tilde{p}$ is also within energy bin b=1, such that correlation value W is indicative for these contributions. All pulse heights $u_1 < p' < u_2$ contribute to the energy bin b=1 in the detector element d=1. The corresponding pulse heights in detector element d=2 are the pulse heights $E-u_2 < \tilde{p} < E-u_1$. Accordingly, only those $\tilde{p}$ which are between $u_1$ and $u_2$ in detector element d=2 contribute to the correlation value W.

In this example, the correlation value W can then be calculated according to:

$$W = \int_{u_1}^{u_2} \tilde{R}(E,E-p) R'(E,p) \Theta(E-p>u_1)\Theta(E-p<u_2) \\ dp * \phi^{d=1}(E) \exp(-f_{m1}(E)*A_{m1}^1 - f_{m2}(E)*A_{m2}^1) + \\ \int_{u_1}^{u_2} \tilde{R}(E,E-p) \tilde{R}(E,p) \Theta(E-p>u_1)\Theta(E-p<u_2) \\ dp * \phi^{d=2}(E) \exp(-f_{m1}(E)*A_{m1}^2 - f_{m2}(E)*A_{m2}^2)$$

wherein θ is a step function which is one in case the statement is true and zero in case the statement is false. Without restriction the correlation values X, Y and Z can be calculated using analogous considerations as for correlation value W. Since the calculation of the correlation values defining the correlation matrix might be time-consuming, it is preferred that the correlation values are not calculated for each step of an iterative method for optimizing the cost function.

The image reconstruction apparatus 1 further comprises an input unit 7 like a keyboard, a computer mouse, a touch screen, etc. and an output unit 8 including a display for showing, for instance, the reconstructed spectral image.

Figure 4:
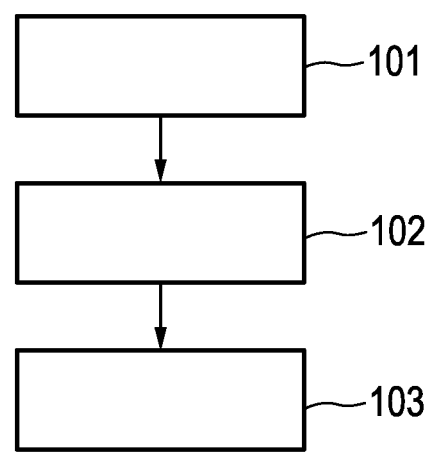
FIG. 4 shows a flowchart exemplarily illustrating an embodiment of a method for reconstructing a spectral image of a region of interest of an object.

In the following an embodiment of a method for reconstructing a spectral image of a region of interest of a patient will be described with reference to a flowchart shown in FIG. 4. In step 101 detector values for each detector element of a plurality of detector elements forming a radiation detector and for each energy bin of a plurality of predefined energy bins are provided by detector value providing unit 2, wherein a detector value is indicative of radiation being detected by a detector element in one of the energy bins after having traversed the region of interest. In step 102 correlation values are provided by the correlation value providing unit 4, wherein a correlation value is indicative of a correlation of a detector value detected by a detector element in an energy bin with at least one of a) a detector value detected by another detector element in the energy bin, b) a detector value detected by another detector element in another energy bin, and c) a detector value detected by the detector element in another energy bin. In step 103 a spectral image is reconstructed by the spectral image reconstruction unit 5 based on the detector values provided by the detector value providing unit 2 and the correlation values provided by the correlation value providing unit 4.

Generally, spectral imaging using multi-photon counting detectors provides many advantages compared to conventional signal energy imaging using scintillator based detectors. These advantages include a higher spatial resolution, the absence of electronic noise, a multi material discrimination and K-edge imaging. On the other hand, multi-photon counting detectors can suffer from effects like pulse pile-up within the readout electronics and charge sharing within the sensor material which can degrade the performance of the detector. A smaller size of the detector elements, i.e. the pixels of the detector, reduces the amount of pulse pile-up events at a certain flux level, but increases the probability of charge sharing between the detector elements. Charge sharing causes double or multiple counting of the same x-ray photon even in adjacent detector elements. Accordingly, the detector values, i.e. the counting results, of adjacent detector elements are positively correlated. This positive correlation is a source of image noise. Additionally, the detected pulse heights are not correct and the original pulse height cannot be recovered directly.

For reducing the charge sharing, a charge sharing grid masking the sensor regions between the pixels can be used or the application of dedicated electronic circuits with coincidence detection between adjacent detector elements can be contemplated. The dedicated electronic circuits aim to detect events of charge sharing and to allocate such events to only one detector element. Both methods of reducing the charge sharing possess have disadvantages. For instance, a charge sharing suppression grid might reduce the amount of detected photons in a detector element, and the processing using a dedicated electronic circuit takes additional time, which effectively enlarges the dead time of the detector and might therefore increase the effect of pulse pile-up.

In computed tomography an anti-scatter grid is commonly applied to reduce the amount of scattered radiation reaching the detector. The lamellas of an anti-scatter grid lie typically in the range between 50 µm to 100 µm. The detector element, i.e. the pixel, size of photon counting detectors have typically dimensions between 50 µm and 500 µm. Thus, each anti-scatter grid cell is likely to contain a subset of detector elements, i.e. pixels. Charge sharing can in this case only take place between the detector elements of a subset in case the lamella of the anti-scatter grid being typically in the range between 50 µm to 100 µm are thick enough to cover the charge sharing region between adjacent pixels.

The effect of charge sharing causes double or multiple counting of the same x-ray photon having interacted with one detector element in adjacent detector elements. If an anti-scatter grid is used for the detector, these multiple counting occurs only within the subset of detector elements defined by the cells of the anti-scatter grid. The detector values, i.e. counting results, of adjacent detector elements are thus positively correlated. This becomes clear in the following example. Assuming one detector element is masked by a strong attenuating object like a bone. In this case, only few photons will traverse the object and thus only a small number of photons are detected by this detector element. Additionally, since only a small number of photons interact with the detector element also the charge sharing or cross talk from this detector element to its adjacent detector elements will be small. Assuming one of the adjacent detector elements only sees a low attenuating object this detector element will interact with quite many photons and will therefore produce also a plurality of charge sharing events, such that the detector values of its adjacent detector elements are influenced by the detector values of the detector element. In this situation the detector values, i.e. counting results, of the first mentioned detector element attenuated by bone will be strongly affected by the additional counts of the secondly mentioned detector element due to the charge sharing effect. Thus, the detector values of the firstly mentioned detector element and the detector values of the secondly mentioned detector element are strongly correlated and the attenuation of the firstly mentioned detector element cannot be estimated correctly without considering the detection value of the secondly mentioned detector element. For optimal solutions of maximum likelihood based processing the mathematical model used in this processing should be as close as possible to the real system. Accordingly, taking the correlations between neighboring detector elements into account allows for a more precise result.

In the claims, the wording "comprising" does not exclude other elements or steps, and the indefinite article "a" or "an" does not exclude a plurality.

A single unit or device may fulfill the functions of several items recited in the claims. The fact that certain measures are recited in mutual different dependent claims does not indicate that the combination of these measures cannot be used to advantage. Procedures like provision of the detector values, the correlation values or the reconstruction of the spectral image, etc. performed by one or several units or devices can be performed by any other number of units or devices. For instance, these procedures can be carried out by a single device. These procedures and/or the control of the image reconstruction apparatus 1 for reconstructing a spectral image in accordance with the method for reconstructing a spectral image can be implemented as program code means of a computer program and/or as dedicated hardware.

A computer program may be stored/distributed on a suitable medium, such as an optical storage medium or a solid state medium, supplied together with or as part of other hardware, but may also be distributed in other forms, such as via the internet or other wired or wireless telecommunication systems.

Any reference signs in the claims should not be construed as limiting the scope.

The invention claimed is:

1. An image reconstruction apparatus for reconstructing a spectral image of a region of interest of an object, comprising:
a memory that stores a plurality of instructions;
processor circuitry that couples to the memory and is configured to execute the plurality of instructions to:
provide detector values for each detector element of a plurality of detector elements forming a radiation detector and for each energy bin of a plurality of predefined energy bins, wherein a detector value is indicative of radiation being detected by a detector element in one of the energy bins after having traversed the region of interest,
provide correlation values, wherein a correlation value is indicative of a correlation of the detector value detected by the detector element in an energy bin with at least one of: a detector value detected by another detector element in the energy bin; a detector value detected by another detector element in another energy bin; and a detector value detected by the detector element in another energy bin,
generate a model value for each detector element and each energy bin, wherein a model value is generated based on an adaptable model of a traversal of a radiation ray through the region of interest and based on a model of the interaction of the radiation ray with the detector element for which the model value is generated; and
reduce noise in a spectral image by reconstructing the spectral image based on the detector values, the model values and the correlation values in such a way that correlation between at least two detector values of the detector values is compensated for, wherein the reconstructing includes reconstructing the spectral image by optimizing a cost function, wherein the cost function is based on the model values, the detector values and the correlation values.

2. The image reconstruction apparatus according to claim 1, wherein the processor circuitry is further configured to provide at least one correlation value for each detector element and each energy bin, wherein a correlation value provided for a detector element and an energy bin is indicative of a correlation of the detector value detected by a detector element in an energy bin with at least one of: a detector value detected by another detector element in the energy bin; a detector value detected by another detector element in another energy bin; and a detector value detected by the detector element in another energy bin.

3. The image reconstruction apparatus according to claim 2, wherein the processor circuitry is further configured to:
provide correlation values defining a correlation matrix; and
reconstruct the spectral image based on the correlation matrix and the detector values.

4. The image reconstruction apparatus according to claim 1, wherein the model value for a detector element and an energy bin is further based on a model of the correlation between the detector value detected by the detector element in the energy bin with at least one detector value detected by another detector element in the energy bin.

5. The image reconstruction apparatus according to claim 1, wherein the model of the interaction of a radiation ray with a detector element is based on a detector response function indicative of the response of the detector element to the incidence of radiation at different energies on the detector element.

6. The image reconstruction apparatus according to claim 1, wherein the cost function is based on differences between the model values and the detector values, wherein each difference is defined as a difference between a model value for an energy bin and a detector element and a detector value detected by the detector element for the energy bin.

7. The image reconstruction apparatus according to claim 1, wherein the cost function includes a data term D determined based on:

$$D=(\vec{\lambda}-\vec{m})C^{-1}(\vec{\lambda}-\vec{m}),$$

wherein C is the correlation matrix defined by the correlation values, $\vec{\lambda}$ is a vector comprising the model values and $\vec{m}$ is a vector comprising the detector values.

8. The image reconstruction apparatus according to claim 1, wherein the processor circuitry is further configured to reconstruct the spectral image based on a penalized likelihood method, wherein the penalized likelihood method is based on the cost function L being defined according to:

$$L=D+R,$$

wherein D is a data term and R is a regularization term.

9. The image reconstruction apparatus according to claim 1, wherein the processor circuitry is further configured to provide detector value subsets, wherein the detector value subsets are defined by detector element subsets.

10. An imaging system for generating a spectral image of a region of interest of an object, comprising:
- a radiation source for generating radiation at different radiation energies,
- a detector for detecting the radiation generated by the radiation source after having traversed the region of interest, wherein the detector comprises a plurality of detector elements and each detector element detects a detector value for each of a plurality of predefined energy bins,
- an image reconstruction apparatus, comprising:
  - a memory that stores a plurality of instructions:
  - processor circuitry that couples to the memory and is configured to execute the plurality of instructions to:
    - provide detector values for each detector element of the plurality of detector elements and for each energy bin of the plurality of predefined energy bins, wherein a detector value is indicative of radiation being detected by a detector element in one of the energy bins after having traversed the region of interest,
    - provide correlation values, wherein a correlation value is indicative of a correlation of the detector value detected by the detector element in an energy bin with at least one of: a detector value detected by another detector element in the energy bin; a detector value detected by another detector element in another energy bin; and a detector value detected by the detector element in another energy bin,
    - generate a model value for each detector element and each energy bin, wherein a model value is generated based on an adaptable model of a traversal of a radiation ray through the region of interest and based on a model of the interaction of the radiation ray with the detector element for which the model value is generated; and
    - reduce noise in a spectral image by reconstructing the spectral image based on the detector values, the model values and the correlation values in such a way that correlation between at least two detector values of the detector values is compensated for, wherein the reconstructing includes reconstructing the spectral image by optimizing a cost function, wherein the cost function is based on the model values, the detector values and the correlation values.

11. An image reconstruction method for reconstructing a spectral image of a region of interest of an object, comprising:
- providing detector values for each detector element of a plurality of detector elements forming a radiation detector and for each energy bin of a plurality of predefined energy bins, wherein a detector value is indicative of radiation being detected by a detector element in one of the energy bins after having traversed the region of interest;
- providing correlation values, wherein a correlation value is indicative of a correlation of a detector value detected by a detector element in an energy bin with at least one of: a detector value detected by another detector element in the energy bin; a detector value detected by another detector element in another energy bin; and a detector value detected by the detector element in another energy bin;
- providing model values for each detector element and each energy bin, wherein a model value is generated based on an adaptable model of a traversal of a radiation ray through the region of interest and based on a model of the interaction of the radiation ray with the detector element for which the model value is generated; and
- reducing noise in a spectral image by reconstructing the spectral image based on the detector values, the model values and the correlation values in such a way that correlation between at least two detector values of the detector values is compensated for.

* * * * *